United States Patent [19]

Coes

[11] 4,070,197
[45] Jan. 24, 1978

[54] GAS TIGHT SILICON CARBIDE BODY

[75] Inventor: Samuel H. Coes, Northborough, Mass.

[73] Assignee: Norton Company, Worcester, Mass.

[21] Appl. No.: 695,840

[22] Filed: June 14, 1976

Related U.S. Application Data

[63] Continuation-in-part of Ser. No. 590,395, June 25, 1975, abandoned.

[51] Int. Cl.$^2$ .................. C04B 35/56; C04B 35/70
[52] U.S. Cl. .................................. 106/44; 156/89; 156/296; 156/304; 156/336; 252/516; 416/241 B
[58] Field of Search .............. 106/44; 423/345; 156/89, 304, 296

[56] References Cited

U.S. PATENT DOCUMENTS

| | | | |
|---|---|---|---|
| 2,319,323 | 5/1943 | Heyroth | 156/336 X |
| 2,964,823 | 12/1960 | Frederiksson | 106/44 X |
| 3,482,791 | 12/1969 | Alliegro | 241/296 |
| 3,923,314 | 12/1975 | Lawler et al. | 423/345 |
| 3,966,885 | 6/1976 | May | 423/344 |

FOREIGN PATENT DOCUMENTS

677,496   1/1964   Canada .................................. 156/89

Primary Examiner—Helen M. McCarthy
Attorney, Agent, or Firm—Arthur A. Loiselle, Jr.

[57] ABSTRACT

A gas impermeable hollow silicon carbide body is formed by slip-casting two separate hollow silicon carbide bodies, the two separate bodies are then cemented together by means of a silicon carbide slip and then the joined pieces are fired at a temperature sufficiently elevated to recrystallize the cast bodies and to form a recrystallized joint between the two pieces, thereafter the body is subjected to a silicon atmosphere to deposit sufficient additional silicon in the body to provide a structure which is essentially impermeable to gases.

4 Claims, No Drawings

GAS TIGHT SILICON CARBIDE BODY

This application is a continuation-in-part of my co-pending application Ser. No. 590,395, filed June 25, 1975 now abandoned.

BACKGROUND OF THE INVENTION

The invention is primarily concerned with the production of hollow bodies which are gas tight and which can be formed into intricate shapes such as is required for the manufacture of high temperature heat exchangers. One of the requirements for such heat exchangers (particularly where one side of the heat exchanger is exposed to highly corrosive gases such as coal-fired combustion gases and the other side of the heating exchanger contains an inert gas used for a gas turbine in a power plant) is that the heat exchanger surfaces be impermeable to penetration by either of the gases which it serves to isolate. While dense silicon carbide pieces have been provided for diffusion furnaces as described in the co-pending application of Alliegro and Coes, Ser. No. 530,083 filed Dec. 6, 1974, U.S. Pat. No. 3,951,587, so far as is known, no composite structures have been created which provide complex hollow shapes where separate cast pieces of silicon carbide are joined to form the unitary gas tight structure which is the principal objective of the present invention.

PRIOR ART

Recrystallization of silicon carbide powder to form high temprature elements goes back at least 75 years to the old U.S. Pat. No. 650,234 to Fitzgerald. A number of patents to Tone (such as U.S. Pat. Nos. 913,324 and 1,013,701) show the siliconization of silicon carbide. Similarly the Hutchins Pat. No. 1,266,478 shows the in situ formation of silicon carbide in a body by reaction between silicon and carbon incorporated in the body. The Heyroth U.S. Pat. No. 2,319,323 shows a method of joining recrystallized silicon carbide bodies by siliconizing a cement formed of carbon plus silicon. Fredriksson U.S. Pat. No. 2,964,823 shows the slip-casting of silicon carbide bodies which can then be fired to recrystallization temperature. The Johnson U.S. Pat. No. 3,079,273 shows the formation of objects from a mixture of silicon carbide, graphite and plastic. The objects are molded from the plastic containing mix and joined by part of the same mix and then fired at an elevated temperature to carbonize the plastic and siliconize the carbon contained in the mixture. Alliegro U.S. Pat. No. 3,482,791 describes the slip-casting of a silicon carbide refiner plate which is then siliconized to increase its impermeability.

SUMMARY OF THE INVENTION

In the present invention, as applied for example to the formation of a U-tube, two straight sections of tube are cast in appropriate plaster of paris molds using the general procedure as described in the above-mentioned Fredriksson and Alliegro patents. Similarly, an elbow is also cast, utilizing the same kind of slip-casting technique. The ends of the straight tubes to be joined to the elbow are then roughened as are the ends of the elbow. These ends are then wetted with water, coated with some of the same silicon carbide slip used for slip-casting and the assembled structure is permitted to dry. Thereafter the product is heated to a temperature on the order of 1970° C to recrystallize the silicon carbide and form a unitary structure which extends through the joints between the ends of the tubes and the elbow. This product is then exposed to silicon in liquid or vapor form until the product in its entirety has picked up on the order of 10 to 30% or more often 15–30% of its weight in silicon. At this point the product is essentially impermeable to air, showing no bubble formation under water when pressurized with air at $2.1 \times 10^{-3}$ kg/mm².

DETAILED DESCRIPTION OF THE INVENTION

The silicon carbide powder to be utilized in forming the slip to be cast is preferably a bimodal mixture containing two separate groups of particle sizes, generally as described in the above-identified Fredriksson and Alliegro patents. The larger particles, which are preferably about 50% of the mixture, have a size distribution between 30 and 150 microns, while the other 50% of the particles are preferably very small, on the order of 3 to 5 microns average particle size. These are mixed with about 13% by weight of water and a temporary binder such as 0.1 to 0.3% of 37.6% by weight of a sodium silicate solution to provide a mix which has the general consistency of heavy cream. This slip is then poured into two appropriate plaster of paris molds and the water is absorbed to provide two structures of sufficient strength to be handled. The structures are then removed from the mold and dried at room temperatures The mating surfaces of the two structures are then roughened with sandpaper, wetted with water and then coated with a layer of the slip used for casting the two pieces. The mating surfaces are then held together until the joint has been solidified and the joined pieces can be handled as a single piece. Thereafter the single piece is fired at recrystallization temprature (on the order of 1970° C) to completely recrystallize the silicon carbide in the two structures and the joint and to provide intergrowth of silicon carbide crystals forming grains across and at the joint. The recrystallized silicon carbide is next impregnated with about 18–30% by weight of silicon by heating in a silicon atmosphere (at about 2150° C) until the piece is substantially completely impregnated with silicon to give an actual density of at least about 2.80 g/cc and a non-interconnected pore volume of 4% or less. The pore volume is calculated by physical measurement of the actual density of the finished article in conjunction with the known theoretical densities of Si and SiC.

In order that those skilled in the art may practice the invention reference should be had to the following non-limiting example.

EXAMPLE 1

The casting slip was prepared from the following combination of materials:

| | |
|---|---|
| 0.1–8 micron silicon carbide | 5.2 kg. |
| 30–170 micron silicon carbide | 4.8 kg. |
| "N brand" sodium silicate solution (37.6% sodium silicate made by Philadelphia Quartz Company) | 8.5 cc. |
| tap water | 1.3 liters |

The mixture was tumbled in plastic milling jars with 2.5 centimeter diameter rubber balls for 16 hours. A portion of the slip was poured into two separate molds to provide two mating tubular sections having the following dimensions:

The first piece was 203.2 cm long, having a 4 ½ inch OD and a 10.16 cm ID and a conical end which tapered down to a cylindrical hole 2.7 cm ID. The other piece, to be mated to the tapered end had a 2.54 cm OD and 1.59 cm ID and was 7.62 cm long.

Additional slip was added to the molds periodically as the slip hardened. The slip was allowed to dry in the molds for about 40 minutes and the resulting casting was then removed from the mold and further dried at room temperature for 24 hours. The mating surfaces of the two bodies were then roughened with sandpaper and wetted with water. Both mating surfaces were then coated with some of the slip used for casting the bodies and the mating surfaces were held together until the joint had solidified. Thereafter the assembled pieces were placed in a furnace and heated to about 1970° C in an argon atmosphere for 40 minutes to recrystallize the silicon carbide. The recrystallized composite tube weighed approximately 7200 grams. 2520 grams of silicon were then added to the furnace and a nitrogen atmosphere was bled into the furnace. The silicon added to the furnace, which was in a separate carbon crucible, constituted about 35% of the weight of the recrystallized silicon carbide piece. The furnace temperature was held at 2150° C for 15 minutes at the end of which time the crystallized silicon carbide piece had absorbed sufficient silicon to increase its weight by 15–20% and provide an extremely dense, continuous, siliconized silicon carbide structure. This product was then tested for permeability and showed no bubbles when pressurized with air at $2.1 \times 10^{-3}$ kg/mm$^2$ while held under water.

While one preferred embodiment of the invention has been described above, numerous modifications thereof can be employed without departing from the spirit of this invention. For example, additional carbon may be provided in the product prior to the final siliconizing operation so as to form additional grains of silicon carbide in the final fired and siliconized structure. This can be achieved in several ways, for example, by including colloidal graphite in the casting slip as shown in Shildhauer U.S. Pat. No. 2,909,972 or by impregnating the recrystallized body with furfuryl alcohol to deposit carbon in the pores of the body, as described in Heyroth U.S. Pat. No. 2,431,326 and Taylor U.S. Pat. No. 3,205,043. In either case the amount of carbon deposited is preferably a small percentage of the amount necessary to fill the voids in the pores in the recrystallized product so that a substantial percentage of the pores are filled with elemental silicon after the siliconizing operation. In general, for ultimate impermeability, it is considered necessary to have at least 10 weight % silicon in the finished body.

While one preferred method of practicing the invention involved the use of casting, it can be made by other ceramic forming techniques such as extrusions, tamping, isostatic pressing etc.

What is claimed is:

1. A gas tight joint between two hollow pieces of silicon carbide which have been recrystallized, said joint consisting essentially of recrystallized silicon carbide which joint and hollow pieces have been impregnated with between 10 and 30 weight % elemental silicon to provide an actual density of at least about 2.80 g/cc., the material of the joint and the material of the pieces having been recrystallized at the same time to provide intergrowth of silicon carbide crystals forming grains between the material of the joint and the material of the pieces, wherein the recrystallized silicon carbide has a maximum grain size of about 150 microns, to produce a joint which is undetectable in a polished section with a microscope at a magnification of 40X and which joined pieces will not show air bubbles when held under water and pressureized at $2.1 \times 10^{-3}$ kg/mm$^2$ with air, and have 4 % or less non-interconnected voids.

2. The process of forming a complex hollow silicon carbide shape which comprises preparing a castable slip of silicon carbide particles having a bimodal distribution of particle sizes, casting two separate hollow pieces from said slip, drying the cast pieces and removing said pieces from the casting molds, thereafter roughening mating surfaces of the two cast pieces to be joined together, wetting said roughened surface and applying a coating of casting slip between the roughened wetted mating surfaces, holding said surfaces together while allowing said coating to dry, then firing the dried cast mated surfaces to a temperature sufficiently elevated to recrystallize the silicon carbide in the body formed of the joint and the cast pieces, impregnating the fired recrystallized product with between 10 and 30 weight % elemental silicon at a temperature in excess of 1950° C, said impregnation being carried out in an inert gas atmosphere containing an appreciable partial pressure of silicon, and wherein said complex, hollow silicon nitride shape does not show permeability to air when held under water and pressurized to $2.1 \times 10^{-3}$ kg/mm$^2$.

3. The process of claim 2 wherein the siliconizing step is accomplished as a part of the recrystallization step.

4. The process of claim 2 wherein colloidal carbon is provided in the joint and is converted to silicon carbide during the siliconizing operation.

* * * * *